(12) United States Patent
Miyake

(10) Patent No.: US 6,717,081 B2
(45) Date of Patent: Apr. 6, 2004

(54) RESET SWITCH

(75) Inventor: Tatsuya Miyake, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 10/106,955

(22) Filed: Mar. 28, 2002

(65) Prior Publication Data
US 2002/0139649 A1 Oct. 3, 2002

(30) Foreign Application Priority Data
Apr. 3, 2001 (JP) ........................................ 2001-104459

(51) Int. Cl.⁷ .............................................. H01H 15/02
(52) U.S. Cl. ..................................... 200/296; 200/295
(58) Field of Search ................................ 200/296, 295, 200/310–317, 523–528, 281–283, 290, 341

(56) References Cited

U.S. PATENT DOCUMENTS

| 3,164,707 A | 1/1965 | Fink ........................... 200/159 |
| 3,213,227 A | 10/1965 | Heath ........................... 200/67 |
| 3,437,775 A | 4/1969 | Piber ........................... 200/167 |
| 4,159,405 A | * 6/1979 | Semonchik et al. ........ 200/296 |
| 4,496,813 A | * 1/1985 | Fukushima .................. 200/314 |
| 5,008,505 A | 4/1991 | Takano et al. ............... 200/531 |

FOREIGN PATENT DOCUMENTS

| DE | 31 11 932 | 10/1982 |
| GB | 2 108 324 | 5/1983 |
| JP | 7-11836 | 1/1995 |

* cited by examiner

Primary Examiner—Lincoln Donovan
Assistant Examiner—Marina Fishman
(74) Attorney, Agent, or Firm—Westerman, Hattori, Daniels & Adrian, LLP

(57) ABSTRACT

A switch body 2 of a reset switch 1 is inserted through an opening 39 formed to a structural member 35 and fixed easily thereto. The switch body 2 is equipped with a circuit for turning off the light of a lamp 3 with a LED when the lamp lens is pushed into the switch body 2. The switch body 2 is removably fixed to the structural member 35 by the spring force of a deformable spring 8, with the structural member 35 being pinched between the spring and the switch body 2. The cord 4 connected to the power source for the lamp 3 is connected to the switch body 2 via a connector 5.

5 Claims, 3 Drawing Sheets

RESET SWITCH

FIELD OF THE INVENTION

The present invention relates to a reset switch, such as an attendant call reset switch equipped to a lavatory on an aircraft and the like, which enables the operator to turn off the lamp (for example, an attendant call indication lamp) by pressing the lamp lens.

DESCRIPTION OF THE RELATED ART

Conventionally, a lavatory unit provided in a vehicle (an aircraft) or used in a house is designed compactly to take up minimum mounting space, and utilizes a panel structure or a honeycomb structure so as to reduce its total weight. The lavatory unit often utilizes a center-folding door as its entrance door. Since the center-folding door takes up less space when opening and closing compared to a single-plate door, such door is utilized not only in a lavatory unit of an aircraft, but also in a telephone booth or in a bath or shower booth.

FIG. 2 is a schematic front view showing the lavatory unit adopting a center-folding door. The center-folding door shown as a whole by reference number 20 comprises a first door panel 21 and a second door panel 22, and the first and second door panels 21 and 22 are connected to each other at adjacent vertical rim portions by a hinge 23 in a foldable manner. The hinge 23 can be formed for example by engaging gears (not shown) equipped to both door panels 21 and 22, which enables the door panels 21 and 22 to be folded smoothly. A coil spring not shown can be disposed within the hinge 23, allowing the center-folding door 20 to be biased toward the closing direction. Moreover, by applying a cover for covering the hinge 23, the state of enclosure at the hinge 23 can be improved. Japanese Patent Laid-Open Publication No. H7-11836 (11836/95) discloses an example of the above-mentioned lavatory unit.

The center-folding door 20 is mounted to an opening 33 formed to a front wall panel 31 of the lavatory unit 30. A pin (not shown) is embedded to the end portion of the first door panel 21, which can be inserted to a hole formed to the opening 33 created to the front wall panel 31 of the lavatory unit 30, by which the whole center-folding door 20 can be rotatably supported by a panel frame 32 shown on the right side of the drawing. On the upper portion of the second door panel 22 is provided a guiding device 24, such as a slider guided along a guide rail 34 equipped to the door opening 33.

The second door panel 22 is equipped with a lock unit 25 that looks like a doorknob. The indicator 26 corresponds to the movement of the lock unit 25, and indicates the status of use of the lavatory unit 30. When the user, such as a passenger on board the aircraft, enters the lavatory unit 30 and operates the lock unit 25 equipped to the inner side wall of the second door panel 22, the second door panel 22 is locked to the front wall 31, and the indicator 26 indicates that the lavatory is occupied.

A push plate 27 is mounted to the first door panel 21 approximate the hinge 23, and when the user pushes the push plate 27, the first door panel 21 rotates centering around the pin and the second door panel 22 moves linearly along the guide rail 34 by the guiding device 24 resisting against the spring force of the door spring, and thereby the folding door folds inwardly centering around the hinge 23, and the door opens. When the pressing force is removed, the center-folding door 20 automatically closes by the restoring force of the door spring.

In the lavatory unit 30, not only the panel members used for forming the first door panel 21 and the second door panel 22 of the center-folding door 20 but also those used for forming the interior of the lavatory, the front wall 31, and the upper panel 35 of the door forming a portion of the front wall 31 all adopt a honeycomb panel structure wherein two panels sandwich a honeycomb structure. The use of such panel structure enables the lavatory unit to maintain the necessary strength while reducing the total weight thereof.

In a conventional lavatory unit equipped inside a vehicle such as an aircraft, an attendant call switch (not shown) is equipped to the interior of the lavatory, so that when the passenger feels sick during use of the lavatory, he or she can call the attendant for help. When the attendant call switch is operated, an attendant call signal is transmitted to the crew cabin, by which a lamp or an alarm is turned on so as to notify the attendant to check on the lavatory. Further, when the attendant call switch is pressed, simultaneously as when a signal is transmitted to the crew cabin, a lens 36 of an attendant call lamp disposed on the panel 35 above the center-folding door 20 of the lavatory unit 30 is turned on, notifying the people near the lavatory unit 30 that an emergency has occurred.

After helping the passenger etc. out of the lavatory, the light of the lens 36 of the attendant call lamp must be turned off. The lamp is turned off by operating an attendant call reset switch (hereinafter simply called "reset switch") 40 formed behind the attendant call lamp 36, wherein the attendant call lamp 36 itself is the operation unit of the switch. By pushing in the lens 36 of the attendant call lamp, the light of the attendant call lamp can be turned off.

FIG. 3 shows a structure for mounting the conventional reset switch to the panel. As shown in FIG. 2, the reset switch 40 is fixed to a structural material called a lintel that is formed by extruding aluminum alloy. The lintel comprises a panel 35 and a panel 37 positioned behind the panel 35, and the reset switch 40 is mounted within a gap 38 formed between the two panels. A cord 42 such as a lead wire for supplying power to the reset switch 40 and for transmitting the signal generated when the switch is operated is connected to a switch body 41 by soldering 43. The attendant call lamp is mounted to the body 41, and a lens 36 is mounted to the switch body 41 from the front side of the front wall 31 through an opening 39 formed to the panel 35. The switch body 41 is brought to the mounting position of the reset switch 40, and at this position, an appropriate tool such as a wrench (for a nut) is moved through the gap 38 formed between the two panels 35 and 37, so as to tighten a nut 44 equipped to the switch body 41. The lens 36 and the switch body 41 of the attendant call lamp are fixed firmly to position when the nut 44 is tightly fit to the panel 35. When mounted, the lens 36 of the attendant call lamp can be pressed into the switch body 41 so as to turn off the attendant call lamp within the body 41 and to reset the reset switch.

The conventional attendant call lamp utilizes a filament lamp, the lifetime of which is as short as 1000 hours. Therefore, when the lifetime of the lamp ends, the attendant call lamp mounted within the body 41 must be replaced. Moreover, since the design of the reset switch 40 differs between an AC type and a DC type corresponding to whether the power source is an AC (alternating current) or a DC (direct current), the appropriate type of reset switch must be placed according to the power source.

As explained, since the conventional reset switch, one example of which is the attendant call reset switch equipped in a lavatory unit, utilizes a filament lamp, often replacement of the lamp is necessary. Moreover, various kinds of switches must be manufactured in advance so as to correspond to the various voltage specifications of airplanes, which requires many kinds of parts to be stocked, and which increases the manufacturing cost and complicates the inventory control. Moreover, in order to replace the reset switch, the operator must insert a tool through the narrow gap formed between the front and rear panels, unfasten the nut so as to remove the reset switch, and fix a new switch onto position by fastening the nut. At this time, the cord must be soldered to the reset switch, which troubles the mounting of the switch to the panel greatly, complicates the maintenance of the switch, and increases the cost related thereto.

SUMMARY OF THE INVENTION

The problem of the conventional reset switch can be solved by providing a reset switch that has a longer life, that can correspond easily to the various voltage specifications, and that can be replaced easily with a new switch by simplifying the work related to connecting the cord and mounting the body to the panel.

The object of the present invention is to solve the above-mentioned problems, by providing a reset switch that utilizes a light having a longer life, that can easily correspond to the change of voltage specifications, and that can be connected easily to a connect cord and be fixed easily to the panel, thereby cutting down the cost related to using and replacing such switch.

The present invention relates to a reset switch comprising a switch body capable of being inserted through an opening formed to a structural member from the front side thereof and being removably fixed thereto; a lamp mounted within the switch body; a lens for the lamp supported by the switch body and capable of being pushed into the switch body; and a circuit equipped to the switch body for turning off the light of the lamp in response to the pressing of said lens; wherein the switch body is equipped with a spring that can be bent and inserted through said opening, and the switch body is removably mounted to the structural member by pinching the structural member between the switch body and the spring by the spring force of said spring.

According to the reset switch, the structural member is pinched by the spring force of the spring between the switch body and the spring inserted through the opening formed to the structural member, and thereby, the switch body is fixed to the structural member. Further, by deforming the spring and pulling the switch body out of the opening of the structural member, the switch body can be removed from the structural member. The lighted lamp is turned off when the lens of the lamp is pushed into the switch body by the circuit equipped to the switch body.

According to the reset switch, the switch body is connected to a power source through a cord connected thereto via a connector. The cord being connected to the power source is extended from the rear side of the structural member, and since this cord is connected to the switch body via a connector, the operation related to connecting and separating the cord with the switch body is simplified. Moreover, it is preferable that the lamp is a LED lamp according to the present reset switch. This is because the life of the LED lamp is semi-permanent, and there is very little maintenance work required. Even further, the circuit can use both a direct-current power supply and an alternating-current power supply for lighting the lamp. When such circuit is adopted, the present reset switch can be applied to various systems irrespective of the type of current being used as power source. Moreover, the present reset switch is an attendant call reset switch, and the lamp is an attendant call lamp that turns on when an attendant call switch is operated.

DETAILED DESCRIPTION OF THE PREFERRED EMBODIMENT

Figure 1:
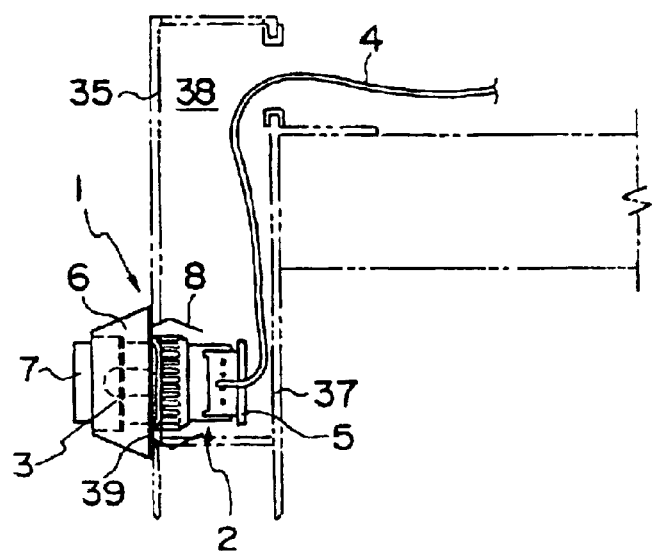
FIG. 1 is an explanatory view showing the mounted state of the reset switch according to the present invention.
Figure 2:
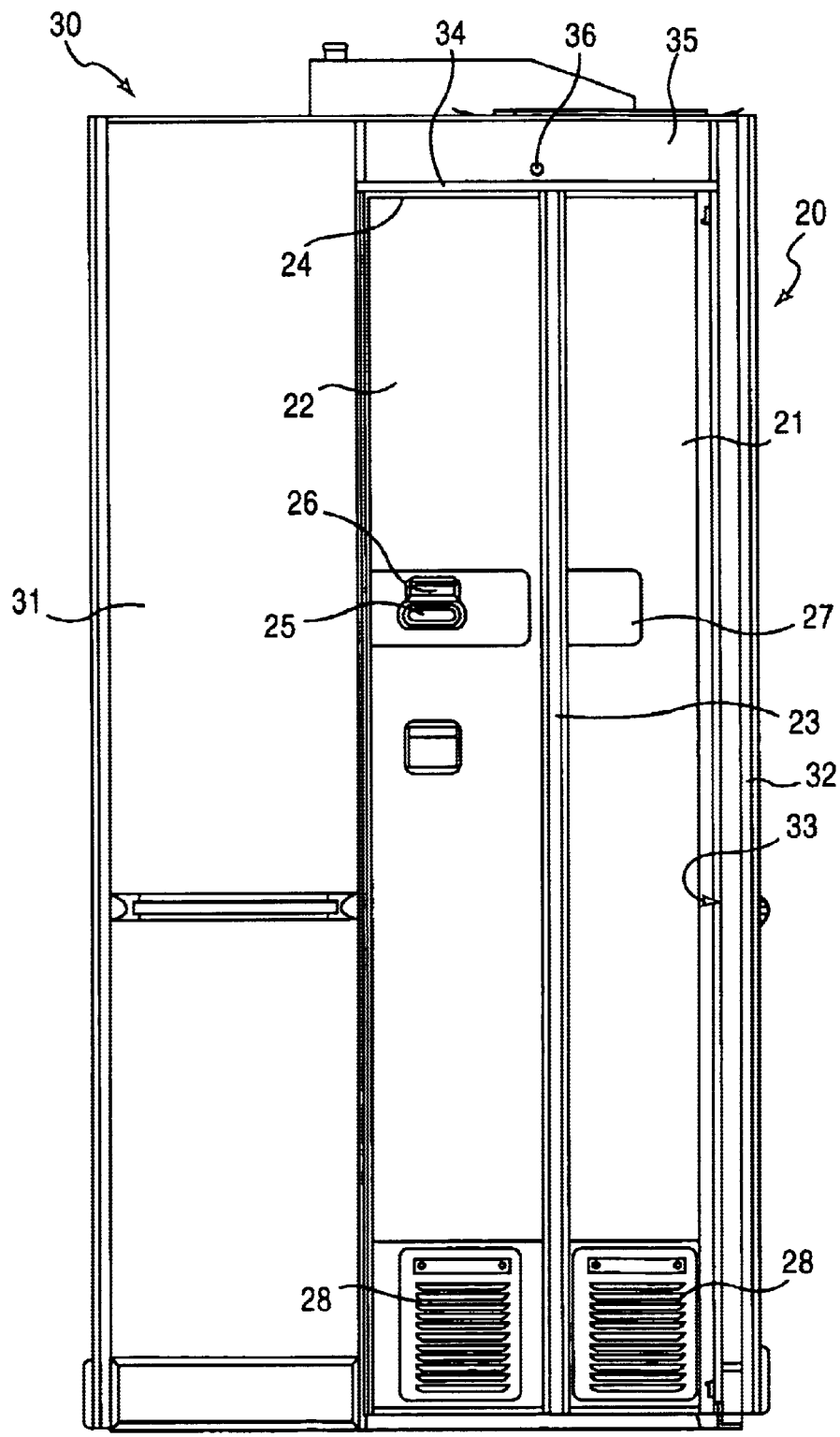
FIG. 2 is a front view showing the conventional lavatory unit with a center-folding door.

The preferred embodiment of the present invention will now be explained with reference to the accompanying drawings. FIG. 1 is an explanatory view showing the mounted state of the reset switch according to the present invention.

Figure 3:
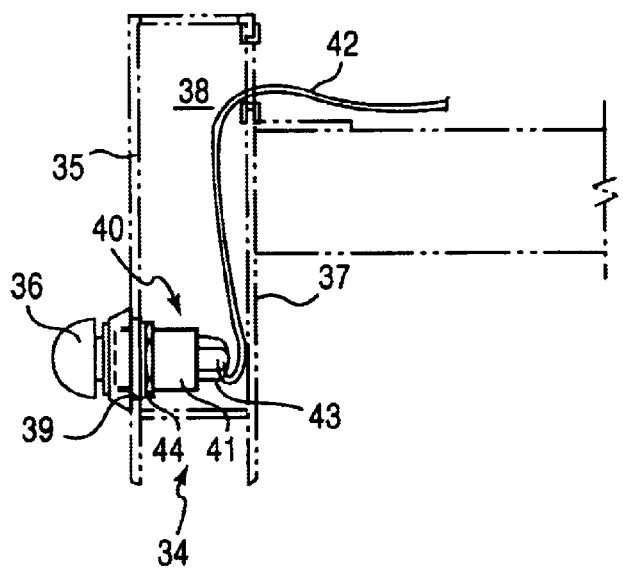
FIG. 3 is an explanatory view showing the structure of the conventional reset switch mounted to a panel.

In FIG. 1, the reset switch is used as an attendant call reset switch, and the parts of which being identical to those of the conventional reset switch mounted to the lavatory unit shown in FIG. 3 are provided with the same reference numbers as those of FIG. 3, the detailed description of which being omitted. With reference to FIG. 1, the attendant call reset switch (hereinafter called "reset switch") 1 is a switch comprising a switch body 2, and an attendant call lamp 3 mounted within the body 2, wherein the switch body 2 includes a circuit for turning off the light of the lamp 3 when a lens 7 of the attendant call lamp is pushed into the body. The attendant call lamp 3 is an inexpensive LED-type lamp having a semi-permanent life compared to the life of the filament lamp. There is no need to exchange the lamp often, and there is substantially no special maintenance work related to exchanging the lamp.

A cord 4 is connected via a connector 5 with the switch body 2. Therefore, during replacement of the reset switch 1, the cord 4 can be separated from or connected securely to the switch body 2 by a simple one-step operation, unlike the replacement of the conventional reset switch where the cord is connected by soldering to the switch body.

The attendant call lamp is equipped with a LED mounted inside a lens 7 supported by a cover 6 that allows the lens to be pressed toward the body. The switch body 2 comprises a cover 6 that comes into contact with the structural member 35, and a spring 8 extending rearward from the cover 6. In order to connect the cord 4 with the switch body 2, the cord 4 is pulled out to the front through an opening 39 formed to the structural material 35, where it is connected to the switch body 2. Thereafter, the spring 8 is bent (deformed) so that it passes through the opening 39 and pushed into the gap 38, and thereby the cover 6 is mounted to the structural member 35 with the member 35 pinched between the cover and the spring. When removing the reset switch 1 from the structural member 35 for replacement of the attendant call lamp, the operator simply holds the cover 6 and pulls it out firmly, so that the spring 8 gives and passes through the opening 39. Accordingly, there is no need according to the present invention to insert a tool (such as a wrench) into the gap 38 and work with the tool inside the narrow limited space to remove and mount the switch, which was required when replacing the conventional reset switch. Moreover, the present reset switch is equipped with a leaf spring designed to enable the whole switch assembly with a connector plug to be mounted easily to the appropriate position on a wall single-handedly without using any tool.

The present invention constructed as explained exerts the following effects. The reset switch can be mounted extremely simply to the appropriate position on the structural material single-handedly without using any tool. After mounting the reset switch to the structural material, if there is a need to remove the reset switch for maintenance work, the reset switch can be removed single-handedly from the structural material without using any tool, by which the maintenance operation is simplified. According to the present invention, the cost related to the mounting and removing of the reset switch is reduced greatly. Conventionally, there was a need to prepare various parts for manufacturing two kinds of switches, an AC-type and a DC-type, but according to the present invention, the circuit is designed to correspond to both types of power sources, by which the cost related to the manufacture and to inventory control of the reset switch is reduced. Even further, an LED having a long life is used as the light for the lamp, by which the life of the attendant call lamp becomes substantially semi-permanent with reduced or almost no maintenance required. A bendable spring is used to enable very easy fixing and removing of the switch body to and from the panel member. Moreover, since the cord for supplying power etc. to the switch is connected to the body using a connector, the connection to the switch body is simplified compared to the conventional switch where the cord must be soldered onto the body. According to the present invention, the cost related to the use and replacement of the reset switch is cut down greatly.

What is claimed is:

1. An attendant call reset switch equipped to a lavatory on board an aircraft the attendant call reset switch comprising: a switch body capable of being inserted through an opening formed to a structural member from the front side thereof and being removably fixed thereto; a lamp mounted within said switch body; a lens for said lamp supported by the switch body and capable of being pushed into said switch body; and a circuit equipped to said switch body for turning off the light of said lamp in response to the pressing of said lens;

wherein said switch body is equipped with a spring that can be bent and inserted through said opening, and said switch body is removably mounted to said structural member by pinching the structural member between said switch body and said spring by the spring force of said spring, wherein said switch body is capable of being removed through said front side of said opening without the use of a tool.

2. A reset switch according to claim 1, wherein said switch body is connected to a power source through a cord connected thereto via a connector.

3. A reset switch according to claim 1, wherein said lamp is a LED lamp.

4. A reset switch according to claim 1, wherein said circuit can use both a direct-current power supply and an alternating-current power supply for lighting said lamp.

5. A reset switch according to claim 1, wherein said reset switch is an attendant call reset switch, and said lamp is an attendant call lamp that turns on when an attendant call switch is operated.

* * * * *